United States Patent
Blonde et al.

(10) Patent No.: US 10,872,442 B2
(45) Date of Patent: Dec. 22, 2020

(54) APPARATUS AND A METHOD FOR ENCODING AN IMAGE CAPTURED BY AN OPTICAL ACQUISITION SYSTEM

(71) Applicant: NTERDIGITAL VC HOLDINGS INC., Wilmington, DE (US)

(72) Inventors: Laurent Blonde, Thorigné-Fouillard (FR); Mozhdeh Seifi, Thorigne-Fouillard (FR); Guillaume Boisson, Pleumeleuc (FR); Paul Kerbiriou, Thorigne-Fouillard (FR); Valter Drazic, Betton (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 296 days.

(21) Appl. No.: 15/759,874

(22) PCT Filed: Aug. 23, 2016

(86) PCT No.: PCT/EP2016/069884
§ 371 (c)(1),
(2) Date: Mar. 14, 2018

(87) PCT Pub. No.: WO2017/045875
PCT Pub. Date: Mar. 23, 2017

(65) Prior Publication Data
US 2018/0260977 A1    Sep. 13, 2018

(30) Foreign Application Priority Data

Sep. 17, 2015 (EP) ..................................... 15306444
Apr. 28, 2016 (EP) ..................................... 16305493

(51) Int. Cl.
*G06T 9/20* (2006.01)
*H04N 19/597* (2014.01)

(52) U.S. Cl.
CPC ............. *G06T 9/20* (2013.01); *H04N 19/597* (2014.11); *G06T 2200/32* (2013.01); *G06T 2207/10052* (2013.01)

(58) Field of Classification Search
CPC ....... G06T 2207/10052; G06T 2200/21; G06T 7/557; G06T 7/80; G06T 15/506;
(Continued)

(56) References Cited

U.S. PATENT DOCUMENTS 6,009,188 A   12/1999  Cohen et al.
6,097,394 A   8/2000   Levoy et al.
(Continued)

FOREIGN PATENT DOCUMENTS

EP   2419884          2/2012
JP   2010176325 A     8/2010
(Continued)

OTHER PUBLICATIONS

Ng, R., "Fourier Slice Photography", ACM Transactions on Graphics (TOG)—Proceedings of ACM SIGGRAPH 2005, vol. 24, No. 3, Jul. 2005, pp. 735-744.
(Continued)

*Primary Examiner* — Kim Y Vu
*Assistant Examiner* — Michael J Vanchy, Jr.
(74) *Attorney, Agent, or Firm* — Robert D. Shedd

(57) ABSTRACT

There are several types of plenoptic devices and camera arrays available on the market, and all these light field acquisition devices have their proprietary file format. However, there is no standard supporting the acquisition and transmission of multi-dimensional information. It is interesting to obtain information related to a correspondence between pixels of a sensor of said optical acquisition system and an object space of said optical acquisition system. Indeed, knowing which portion of the object space of an (Continued)

optical acquisition system a pixel belonging to the sensor of said optical acquisition system is sensing enables the improvement of signal processing operations. The notion of pixel beam, which represents a volume occupied by a set of rays of light in an object space of an optical system of a camera is thus introduce.

14 Claims, 6 Drawing Sheets

(58) Field of Classification Search
CPC ......... G06T 1/0007; G06T 15/06; G06T 7/62;
G06T 5/50; G06T 2207/20061; G06T
5/002; G06T 7/75; G06T 19/20; G06T
2200/32; G06T 9/20; G02B 27/0075;
G02B 27/0012; G02B 27/0955; G02B
26/02; G02B 26/0841; G02B 7/34; G02B
26/0875; G02B 27/0025; G02B 27/0961;
G02B 30/27; G02B 30/50; G02B 6/10;
G01J 1/4257; G01J 3/02; G01J 3/0205;
G01J 3/0208; G01J 3/0256; G01J 3/0291;
G01J 3/2823; G01J 3/453; G01J 4/04;
H04N 13/232; H04N 5/225; H04N
13/106; H04N 13/243; H04N 5/2254;
H04N 5/378; H04N 5/9201; H04N 9/04;
H04N 13/25; H04N 19/597; G01N 21/21;
G01N 21/35; G01N 21/3504; G01N
2201/1296
See application file for complete search history.

(56) References Cited

U.S. PATENT DOCUMENTS

| | | |
|---|---|---|
| 8,873,112 B2 | 10/2014 | Suwa et al. |
| 9,191,595 B2 | 11/2015 | Ikedo |
| 9,456,118 B2 | 9/2016 | Nagano et al. |
| 2010/0265385 A1 | 10/2010 | Knight et al. |
| 2012/0200810 A1 | 8/2012 | Horikawa |
| 2013/0235261 A1 | 9/2013 | Berkner et al. |
| 2013/0250043 A1 | 9/2013 | Kostrzewski et al. |
| 2014/0043320 A1 | 2/2014 | Tosaya et al. |
| 2014/0098191 A1* | 4/2014 | Rime .................. H04N 5/2254 348/46 |
| 2014/0369594 A1* | 12/2014 | Ghasemi ................ G06T 7/168 382/154 |
| 2015/0339824 A1* | 11/2015 | Uliyar .................. H04N 13/232 348/46 |

FOREIGN PATENT DOCUMENTS

| | | |
|---|---|---|
| JP | 2013115717 A | 6/2013 |
| JP | 2013165475 A | 8/2013 |
| RU | 2549522 C2 | 4/2015 |
| WO | WO2006129864 | 12/2006 |
| WO | WO2010120591 | 10/2010 |

OTHER PUBLICATIONS

Culoma, A., "Propagation des faisceaux gaussiens. Transport des faisceaux de Puissance", Summer School Course—Optical Systems, Cargèse, Jul. 1991, Société Française d'Optique, vol. 3, (1992), pp. 245-262.

Anonymous, "Laser Diode Technical Note 1—Beam Circularization and Astigmatism-correction", COHERENT Inc.—Auburn Group—Laser Diode Modules, Auburn, California, USA, 1998, pp. 1-8.

Anonymous, "An Experimental Plenoptic Camera", http://cameramaker.se/plenoptic.htm, Jan. 2016, pp. 1-2.

Levin et al., "Understanding camera trade-offs through a Bayesian analysis of light field projections", 10th European Conference on Computer Vision (ECCV), Marseille, France, Oct. 12, 2008, pp. 88-101.

Park et al., "Light ray field capture using focal plane sweeping and its optical reconstruction using 3D displays", Optics Express, vol. 22, No. 21, Oct. 20, 2014, pp. 25444-25454.

Ng, R., "Digital Light Field Photography", Stanford University, Department of Computer Science, Doctoral Dissertation, Jul. 2006, pp. 1-203.

Wanner et al., "Generating EPI Representations of 4D Light Fields with a Single Lens Focused Plenoptic Camera", 7th International Symposium on Visual Computing (ISVC 2011), Las Vegas, Nevada, USA, Sep. 26, 2011, pp. 90-101.

* cited by examiner

APPARATUS AND A METHOD FOR ENCODING AN IMAGE CAPTURED BY AN OPTICAL ACQUISITION SYSTEM

This application claims the benefit of International Application PCT/EP2016/069884, under 35 U.S.C. § 365, filed on Aug. 23, 2016, which was published in accordance with Article 21(2) on Mar. 23, 2017, in English, and which claims the benefit of European Patent Application No. 15306444.9, filed on Sep. 17, 2015 and European Patent Application No. 16305493.5, filed on Apr. 28, 2016.

TECHNICAL FIELD

The present invention relates to generation of data representing a light field.

BACKGROUND

The acquisition of four-dimensional or 4D light-field data, which can be viewed as a sampling of a 4D light field, i.e. the recording of light rays, is explained in the article "*Understanding camera trade-offs through a Bayesian analysis of light field projections*" by Anat Levin and al., published in the conference proceedings of ECCV 2008 is an hectic research subject.

Compared to classical two-dimensional or 2D images obtained from a camera, 4D light-field data enable a user to have access to more post-processing features that enhance the rendering of images and the interactivity with the user. For example, with 4D light-field data, it is possible to perform refocusing of images with freely selected distances of focalization meaning that the position of a focal plane can be specified/selected a posteriori, as well as changing slightly the point of view in the scene of an image. In order to acquire 4D light-field data, several techniques can be used. For example, a plenoptic camera is able to acquire 4D light-field data. Details of the architecture of a plenoptic camera are provided in FIG. 1A. FIG. 1A is a diagram schematically representing a plenoptic camera 100. The plenoptic camera 100 comprises a main lens 101, a micro-lens array 102 comprising a plurality of micro-lenses 103 arranged in a two-dimensional array and an image sensor 104.

Another way to acquire 4D light-field data is to use a camera array as depicted in FIG. 1B. FIG. 1B represents a multi-array camera 110. The multi-array camera 110 comprises a lens array 112 and an image sensor 114.

In the example of the plenoptic camera 100 as shown in FIG. 1A, the main lens 101 receives light from an object (not shown on the figure) in an object field of the main lens 101 and passes the light through an image field of the main lens 101.

At last, another way of acquiring a 4D light field is to use a conventional camera that is configured to capture a sequence of 2D images of a same scene at different focal planes. For example, the technique described in the document "*Light ray field capture using focal plane sweeping and its optical reconstruction using 3D displays*" by J.-H. Park et al., published in OPTICS EXPRESS, Vol. 22, No. 21, in October 2014, may be used to achieve the acquisition of 4D light field data by means of a conventional camera.

There are several ways to represent 4D light-field data. Indeed, in the Chapter 3.3 of the Ph.D dissertation thesis entitled "*Digital Light Field Photography*" by Ren Ng, published in July 2006, three different ways to represent 4D light-field data are described. Firstly, 4D light-field data can be represented, when recorded by a plenoptic camera by a collection of micro-lens images. 4D light-field data in this representation are named raw images or raw 4D light-field data. Secondly, 4D light-field data can be represented, either when recorded by a plenoptic camera or by a camera array, by a set of sub-aperture images. A sub-aperture image corresponds to a captured image of a scene from a point of view, the point of view being slightly different between two sub-aperture images. These sub-aperture images give information about the parallax and depth of the imaged scene. Thirdly, 4D light-field data can be represented by a set of epipolar images see for example the article entitled: "*Generating EPI Representation of a 4D Light Fields with a Single Lens Focused Plenoptic Camera*", by S. Wanner and al., published in the conference proceedings of ISVC 2011.

There are several types of plenoptic devices and camera arrays available on the market, and all these light field acquisition devices have their proprietary file format. Thus it appears that light-field technology cannot live besides regular 2D or 3D imaging as there is no standard supporting the acquisition and transmission of multi-dimensional information. The present invention has been devised with the foregoing in mind.

SUMMARY OF INVENTION

According to a first aspect of the invention there is provided an apparatus for encoding an image captured by an optical acquisition system, said apparatus comprising a processor configured to compute for at least one pixel of a sensor of said optical acquisition system parameters defining a volume in an object space of the optical acquisition system occupied by a set of rays of light passing through a pupil of said optical acquisition system and a conjugate of said at least one pixel in the object space of the optical acquisition system in a direction normal to a surface of the pupil, said volume occupied by said set of rays of light being called a pixel beam.

According to an embodiment of the apparatus, the processor is configured to associate the parameters representing pixel beams to an image acquired by the optical acquisition system to be encoded.

According to an embodiment of the apparatus, the parametric representation of the pixel beam is a hyperboloid of one sheet defined by the following equations:

$$\begin{cases} x = a\sqrt{1 + \frac{(z-z_P)^2}{c^2}} \cdot \cos(v) + z \cdot \tan(\theta_x) \\ y = a\sqrt{1 + \frac{(z-z_P)^2}{c^2}} \cdot \sin(v) + z \cdot \tan(\theta_y) \end{cases}$$

where x, y, and z are the coordinates in the object space of a point belonging to the surface of the hyperboloid, $z_P$, $\theta_x$, $\theta_y$, a, $z_P$ representing a distance of the smallest section of the pixel beam, called the waist, which corresponds to the conjugate of the pixel in the object space of the optical acquisition system in a direction normal to a surface of the pupil, $\theta_x$, $\theta_y$ representing shear angles defining a direction of the waist from the centre of the pupil, a representing a dimension of waist; c is a parameter dependent on a defining the angular aperture of the pixel beam, and v is an angle varying in [0, 2π] interval.

According to an embodiment of the apparatus, the parametric representation of the pixel beam is a hyperboloid of one sheet defined by the following equations:

$$\begin{cases} x = a\sqrt{1 + \frac{(z-z_P)^2}{c^2}} \cdot [\alpha \cdot \rho_O + (1-\alpha) \cdot \rho_P] \cdot \cos(v) + z \cdot \tan(\theta_x) \\ y = a\sqrt{1 + \frac{(z-z_P)^2}{c^2}} \cdot [\alpha \cdot A_O \cdot \rho_O + (1-\alpha) \cdot A_P \cdot \rho_P] \cdot \sin(v) + z \cdot \tan(\theta_y) \end{cases}$$

where $A_O$ is the parameter representing an aspect ratio for an asymmetric pupil, $A_P$ is the parameter representing an aspect ratio for an asymmetric waist, a is the parameter related to a propagation of a section of the pixel beam between the pupil and the waist, $\rho_O$ is the parameter representing a polar radius factor for the pupil and $\rho_P$ is the parameter representing a polar radius factor for the waist.

According to an embodiment of the apparatus, a pixel beam is represented by at least a first set of parameters representing an axis of the hyperboloid called a chief ray and a second set of parameters representing a family of generating rays enabling the generation of a surface of the hyperboloid by rotating around the chief ray.

According to an embodiment of the apparatus, the parametric representation of the pixel beam is a union of a front cone and a rear cone, the front cone and the rear cone overlapping each other.

According to an embodiment of the apparatus, the parametric representation of the pixel beam as the union of a front cone and a rear cone is given by the following equations:

$$\begin{cases} z_{front} = \frac{P \cdot z_W + W \cdot z_P}{P+W} \\ z_{rear} = \frac{P \cdot z_W - W \cdot z_P}{P-W} \end{cases}$$

where $z_{front}$ represents the z-coordinate of the apex of the front cone, $z_{rear}$ represents the z-coordinate of the apex of the rear cone, P, $z_P$, W and $z_w$ respectively denote the diameter of the pupil of the pixel beam with P>0, its z-coordinate, the diameter and the z-coordinate of the waist of the pixel beam with $0<W<+\infty$, and its z-coordinate $0<z_w<+\infty$, and $$\begin{cases} \tan\theta_{front} = \frac{W/2}{|z_{front} - z_w|} \\ \tan\theta_{rear} = \frac{W/2}{|z_{rear} - z_w|} \end{cases}$$

where $\theta_{front}$ and $\theta_{rear}$ are the apex angles of respectively the front cone and the rear cone.

According to an embodiment of the apparatus, the parametric representation of the pixel beam as the union of a front cone and a rear cone is given by the following equations when $W=+\infty$ and $z_w=+\infty$:

$$\frac{1}{z_{front} - z_P} = \frac{p}{P \cdot f} = \frac{1}{z_P - z_{rear}}$$

where p and f respectively represent the diameter of the pixel with p>0 and the focal length of the optics of the optical acquisition system with f>0, and $$\begin{cases} \tan\theta_{front} = \frac{W/2}{|z_{front} - z_w|} \\ \tan\theta_{rear} = \frac{W/2}{|z_{rear} - z_w|} \end{cases}.$$

Another object of the invention is a method for encoding an image captured by an optical acquisition system, said method comprising computing for at least one pixel of a sensor of said optical acquisition system parameters defining a volume in an object space of the optical acquisition system occupied by a set of rays of light passing through a pupil of said optical acquisition system and a conjugate of said at least one pixel in the object space of the optical acquisition system in a direction normal to a surface of the pupil, said volume occupied by said set of rays of light being called a pixel beam.

The method according to an embodiment of the invention, further comprises associating the parameters representing pixel beams to an image acquired by the optical acquisition system to be encoded.

Another object of the invention is an apparatus for processing an image captured by an optical acquisition system, said apparatus comprising a processor configured to process said image based on parameters associated to at least one pixel of a sensor of the optical acquisition system, said parameters defining a volume in an object space of the optical acquisition system occupied by a set of rays of light passing through a pupil of said optical acquisition system and a conjugate of said at least one pixel in the object space of the optical acquisition system in a direction normal to a surface of the pupil, said volume occupied by said set of rays of light being called a pixel.

According to an embodiment of the apparatus for processing an image captured by an optical acquisition system, the processor is configured to process the captured image by:
  de-multiplexing said captured image,
  de-mosaicking said captured image,
  refocusing said captured image, or
  mixing said captured image with at least another image captured by a different optical acquisition system.

Another object of the invention is a method for processing an image captured by an optical acquisition system, said method comprising processing said image based on parameters associated to at least one pixel of a sensor of the optical acquisition system, said parameters defining a volume in an object space of the optical acquisition system occupied by a set of rays of light passing through a pupil of said optical acquisition system and a conjugate of said at least one pixel in the object space of the optical acquisition system in a direction normal to a surface of the pupil, said volume occupied by said set of rays of light being called a pixel.

According to an embodiment of the method for processing an image captured by an optical acquisition system, processing the captured image consists in:
  de-multiplexing said captured image,
  de-mosaicking said captured image,
  refocusing said captured image, or
  mixing said captured image with at least another image captured by a different optical acquisition system.

Another object of the invention is a signal transmitted by a first apparatus capable of encoding an image captured by an optical acquisition system, to a second apparatus capable of processing said captured image captured, said signal carrying a message comprising parameters defining a volume in an object space of the optical acquisition system occupied by a set of rays of light passing through a pupil of said optical acquisition system and a conjugate of said at least one pixel in the object space of the optical acquisition system in a direction normal to a surface of the pupil, said volume occupied by said set of rays of light being called a pixel beam, the processing of the captured image by the second apparatus being based on said parameters.

Some processes implemented by elements of the invention may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as a "circuit", "module" or "system'. Furthermore, such elements may take the form of a computer program product embodied in any tangible medium of expression having computer usable program code embodied in the medium.

Since elements of the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

As will be appreciated by one skilled in the art, aspects of the present principles can be embodied as a system, method or computer readable medium. Accordingly, aspects of the present principles can take the form of an entirely hardware embodiment, an entirely software embodiment, (including firmware, resident software, micro-code, and so forth) or an embodiment combining software and hardware aspects that can all generally be referred to herein as a "circuit", "module", or "system". Furthermore, aspects of the present principles can take the form of a computer readable storage medium. Any combination of one or more computer readable storage medium(a) may be utilized.

For any optical acquisition system, may it be plenoptic or not, in addition to raw images or epipolar images representing 4D light-field data captured by the optical acquisition system, it is interesting to obtain information related to a correspondence between pixels of a sensor of said optical acquisition system and an object space of said optical acquisition system. Knowing which portion of the object space of an optical acquisition system a pixel belonging to the sensor of said optical acquisition system is sensing enables the improvement of signal processing operations such as de-multiplexing, de-mosaicking, refocusing, etc., and the mixing of images captured by different optical systems with different characteristics. Furthermore, information related to the correspondence between the pixels of the sensor of the optical acquisition system and the object space of said optical acquisition system are independent of the optical acquisition system.

Figure 1A:
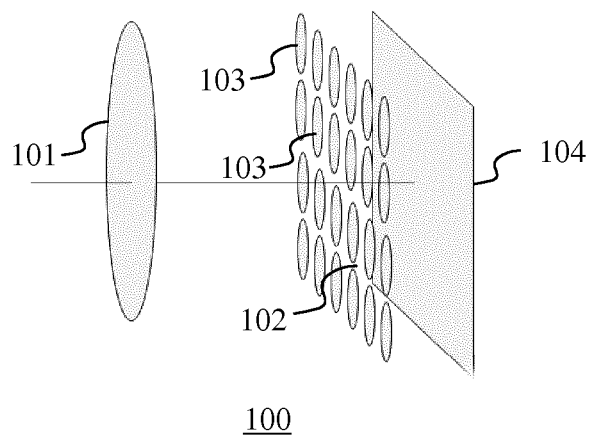
FIG. 1A is a diagram schematically representing a plenoptic camera.
Figure 1B:
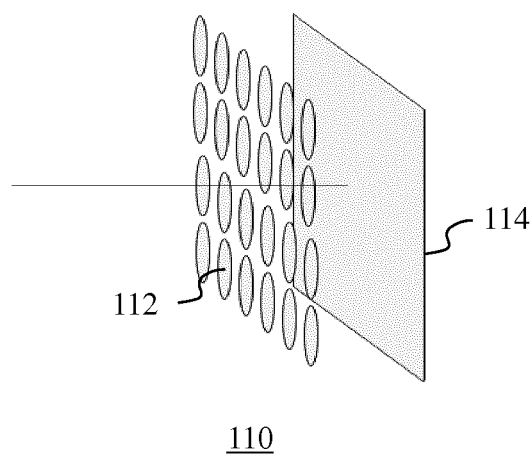
FIG. 1B represents a multi-array camera.
Figure 2:
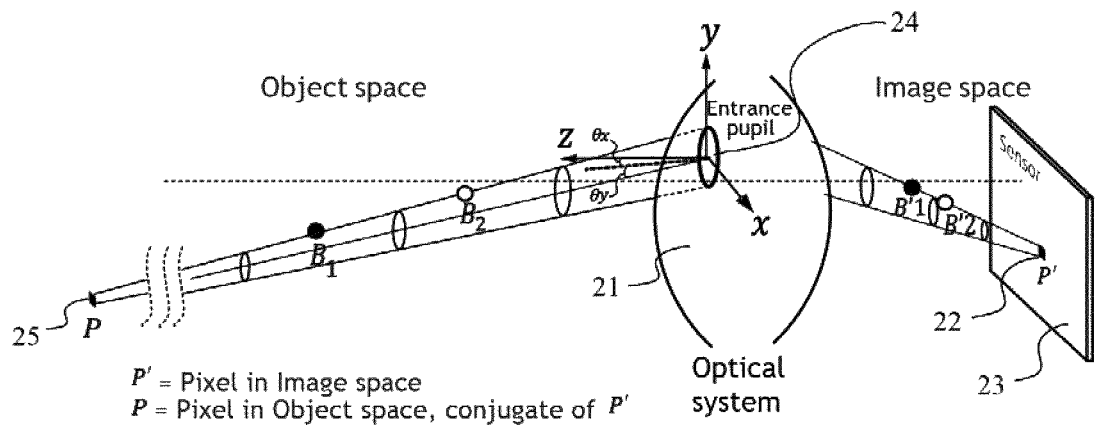
FIG. 2 represents a volume occupied by a set of rays of light in an object space of an optical system of a camera or optical acquisition system.

The present disclosure introduces the notion of pixel beam 10, shown on FIG. 2, which represents a volume occupied by a set of rays of light passing through a pupil of an optical system 11 of a camera (not shown on FIG. 2) and a conjugate of a pixel of a sensor of the camera in an object space of the optical system in a direction normal to a surface of the pupil.

The set of rays of light is sensed by a pixel 22 of a sensor 23 of the camera through a pupil 24 of said optical system 21. The optical system 21 may be a combination of lenses fit for photo or video cameras. A pupil of an optical system is defined as the image of an aperture stop as seen through said optical system, i.e. the lenses of the optical acquisition system, which precedes said aperture stop. An aperture stop is an opening which limits the amount of light which passes through the optical system of the optical acquisition system. For example, an adjustable blade diaphragm located inside a camera lens is the aperture stop for the lens. The amount of light admitted through the diaphragm is controlled by the diameter of the diaphragm opening which may adapted depending of the amount of light a user of the camera wishes to admit. For example, making the aperture smaller reduces the amount of light admitted through the diaphragm, and, simultaneously, increases the depth of focus. The apparent size of a stop may be larger or smaller than its physical size because of the refractive action of a portion of the lens. Formally, a pupil is the image of the aperture stop through all lenses of the optical acquisition system located between the physical stop and the observation space.

A pixel beam 10 is defined as a pencil of rays of light that reach a given pixel 22 when propagating through the optical system 21 via an entrance pupil 24. As light travels on straight lines in free space, the shape of such a pixel beam 20 can be defined by two sections, one being the conjugate 25 of the pixel 22, and the other being the entrance pupil 24. The pixel 22 is defined by its non-null surface and its sensitivity map.

Figure 3:
FIG. 3 represents a hyperboloid of one sheet.
Figure 3:
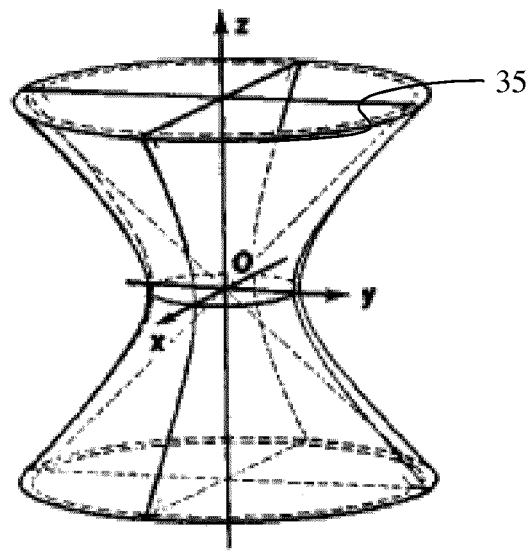

In a first embodiment of the invention, a pixel beam 30 may be represented by an hyperboloid of one sheet, as shown on FIG. 3, supported by two elements: the pupil 34 and the conjugate 35 of the pixel 22 in the object space.

A hyperboloid of one sheet is a ruled surface that can support the notion of pencil of rays of light and is compatible with the notion of "étendue" of physical light beams, notion linked to the preservation of energy across sections of the physical light beams.

Figure 4:
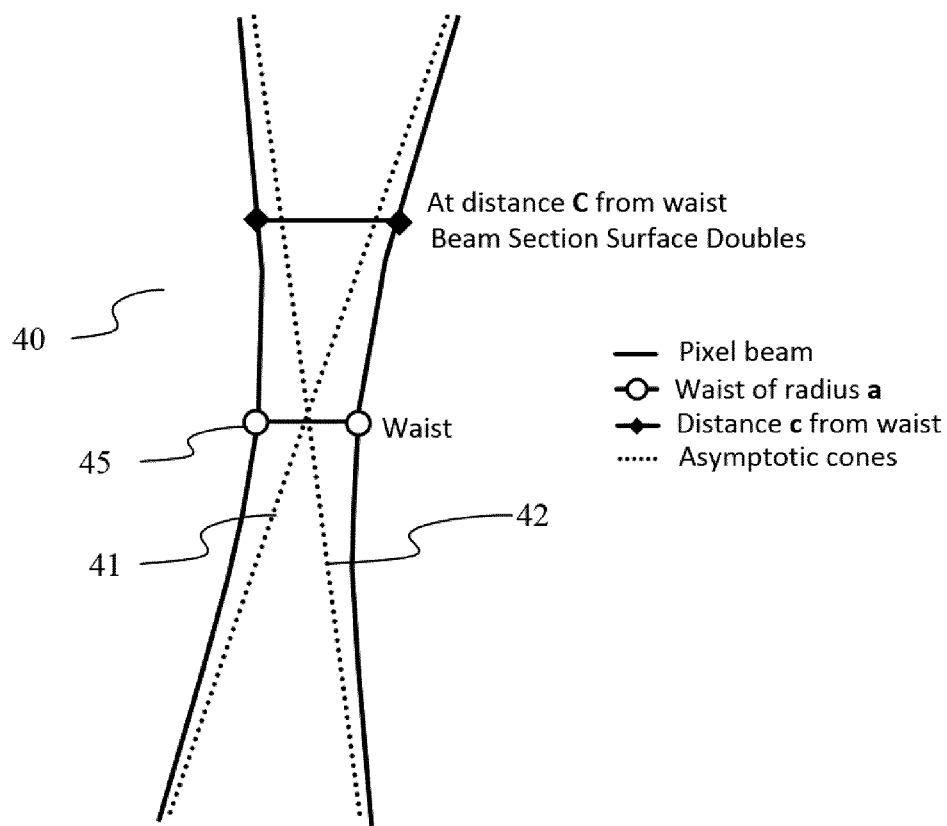
FIG. 4 represents another view of a hyperboloid of one sheet.

As represented on FIG. 4, a hyperboloid of one sheet 40 is mostly identical to its asymptotic cones 41, 42, except in the fundamental region of its smallest section, called the waist 45, which corresponds to the conjugate 25 in the object space. For plenoptic systems, such as light-field cameras, this is the region where space sampling by multiple path rays is performed. Sampling space with unique cones degenerating to a point in this region is not adequate, as pixel 22 sensitivity is significant on some tens of square microns on its surface and cannot be represented by a mathematical point with infinitely small surface as would be a cone tip.

In an embodiment of the invention, each pixel beam 20, 30, 40, is defined by four independent parameters: $z_P$, $\theta_x$, $\theta_y$, a defining the position and size of the pixel conjugate 25, 45, in front of the pupil 24, 34 and by six pupilar parameters $x_O$, $y_O$, $z_O$, $\theta_{x0}$, $\theta_{y0}$, r which define the position, orientation and radius of the pupil 24, 34. These six pupilar parameters are common to the collection of pixel beams, when represented by a hyperboloid of one sheet, sharing a same pupil 24, 34. Indeed, a pixel beam represents the volume occupied by a set of rays of light in the object space of the optical system 21 sensed by the pixel 22 through the pupil 24, i.e. to a given couple pixel 22/pupil 24, 34 corresponds a unique pixel beam 20, 30, 40, but a plurality of distinct pixel beams can be supported by a same pupil 24, 34.

An origin O of a coordinate system (x, y, z) in which the parameters of the hyperboloid of one sheet representing the pixel beam 20, 30, 40 are defined corresponds to the centre of the pupil 24 as shown on FIG. 2, where the z axis defines a direction normal to the surface of the pupil 24, 34.

The parameters $\theta_x$, $\theta_y$, define chief ray directions relative to the entrance of the pupil 24 centre. They depend on the pixel 22 position on the sensor 23 and on the optical elements of the optical system 21. More precisely, the parameters $\theta_x$, $\theta_y$, represent shear angles defining a direction of the conjugate 25 of the pixel 22 from the centre of the pupil 24.

The parameter $z_P$ represents a distance of the waist 45 of the pixel beam 20, 30, 40, or the conjugate 25 of the pixel 22, along the z axis.

The parameter a represents the radius of the waist 45 of the pixel beam 20, 30, 40.

For optical systems 21 where optical distortions and field curvatures may be modelled, the parameters $z_P$ and a can depend on the parameters $\theta_x$ and $\theta_y$ via parametric functions.

The four independent parameters are related to the pixel 22 and its conjugate 25.

The six complementary pupilar parameters defining a pixel beam 20, 30, 40 are:
  r which represents the pupil 24, 34 radius,
  $x_O$, $y_O$, $z_O$ which represent the coordinates of the pupil 24, 34 centre in the (x, y, z) coordinate system, and
  $\theta_{x0}$, $\theta_{y0}$ which represent the orientation of the pupil 24, 34 in the reference (x, y, z) coordinate system.

These six pupilar parameters are related to the pupil 24, 34. Another parameter c is defined. Such a parameter c is dependent on the parameters $z_P$ and a related to the pixel 22 and its conjugate 25 and on the parameters r related to the pupil 24, 34. The parameter c defines the angular aperture α of the pixel beam 20, 30, 40 and is given by the formula $$\tan(\alpha) = \frac{a}{c}.$$

Thus the expression of the parameter c is given by the following equation:

$$c^2 = \frac{a^2 z_P^2}{r^2 - a^2} \qquad (1)$$

The coordinates (x, y, z), in the object space, of points belonging to the surface delimiting the pixel beam 20, 30, 40 are function of the above defined sets of parameters related to the pupil 24, and to the conjugate 25 of the pixel. Thus, equation (2) enabling the generation of the hyperboloid of one sheet representing the pixel beam 20, 30, 40 is:

$$\frac{(x - z.\tan(\theta_x))^2}{a^2} + \frac{(y - z.\tan(\theta_y))^2}{a^2} - \frac{(z - z_P)^2}{c^2} = 1 \qquad (2)$$

A parametric equation (3) of the same hyperboloid representing the pixel beam 20, 30, 40 is:

$$\begin{cases} x = a\sqrt{1 + \frac{(z - z_P)^2}{c^2}}.\cos(v) + z.\tan(\theta_x) \\ y = a\sqrt{1 + \frac{(z - z_P)^2}{c^2}}.\sin(v) + z.\tan(\theta_y) \end{cases} \qquad (3)$$

wherein v is an angle in the (x, y) plane enabling the generation of the pixel beam 20, 30, 40 from a generating hyperbola, v varies in [0, 2π] interval, and z∈[0, ∞] is the coordinate along the z axis which defines a direction normal to the surface of the pupil 24, 34. Equations (2) and (3) are written on the assumption that the section of the pixel 22 and its conjugate 25 are circular and that the section of the pupil 24, 34 is circular as well.

In order to obtain a precise description of how the pixel beams 20, 30, 40 sample the object space of the optical system 21, it is interesting to determine how the geometry of the section of the pixel 22 and the section of the pupil 24, 34 paves the object space. This leads to the knowledge of how light emitted in the object space is distributed between the different pixels 22 of the sensor 23.

Another set of parameters is thus defined in order to describe the shape of the sections of the pupil 24, 34 and of the pixel 22 and of the conjugate 25 of the pixel 22.

A first independent parameter $A_O$ is defined. The parameter $A_O$ represents an aspect ratio to allow for asymmetric pupil 24, 34.

A second independent parameter $A_P$ is defined. The parameter $A_P$ represents an aspect ratio to allow for asymmetric pixel beams at the conjugate 25, 45 of the pixel 22—the waist.

A third parameter dependent parameter α is defined as follow:

$$\alpha = \left| \frac{1 - \left(\frac{z}{z_P}\right)^k}{1 + \left(\frac{z}{z_P}\right)^k} \right| \quad (4)$$

α is a coefficient which represents the propagation of the pixel beam 20, 30, 40 shape along the z axis between the pupil 24, 34 and the conjugate 25, 45 of the pixel 22, independently from the shape of the sections of the pupil 24, 34 and of the pixel 22; and from the conjugate 25, 45 of the pixel 22 to infinity. The parameter k is a parameter adjusting the evolution of the pixel beam 20, 30, 40 shape along the z axis. A value of k≈1.3 approximates a linear variation of the parameter α between the pupil 24, 34 and the conjugate 25, 45 of the pixel 22.

Two parameters $\rho_O$ and $\rho_P$, called polar radius factors, are describing respectively the shape of the pupil 24, 34 and the shape of the conjugate 25, 45 of the pixel 22. The parameters $\rho_O$ and $\rho_P$ are defined by the following equation:

$$\rho = \min\left(\frac{1}{abs(\cos(v))}, \frac{1}{abs(\sin(v))}\right) \quad (5)$$

where ρ is the polar radius defining a unit square point for angle v.

The following table, called table 1, gives examples of the values of parameters $\rho_O$ and $\rho_P$ when $A_O = A_P = 1.0$:

TABLE 1

| $\rho_O$ | $\rho_P$ | |
|---|---|---|
| 1.0 | 1.0 | circular pupil 24, 34 and pixel conjugate 25, 45 |
| 1.0 | ρ | circular pupil 24, 34 and square shape pixel conjugate 25, 45 |
| ρ | 1.0 | square shape pupil 24, 34 and circular pixel conjugate 25, 45 |
| ρ | ρ | square shape pupil 24, 34 and square shape pixel conjugate 25, 45 |

Taking into account the above defined parameters related to the shape of the sections of the pupil 24, 34 and the pixel 22 and the conjugate 25 of the pixel 22, an extended parametric equation (6) of the hyperboloid representing the pixel beam 20, 30, 40 is:

$$\begin{cases} x = a\sqrt{1 + \frac{(z-z_P)^2}{c^2}} \cdot [\alpha.\rho_O + (1-\alpha).\rho_P].\cos(v) + z.\tan(\theta_x) \\ y = a\sqrt{1 + \frac{(z-z_P)^2}{c^2}} \cdot [\alpha.A_O.\rho_O + (1-\alpha).A_P.\rho_P].\sin(v) + z.\tan(\theta_y) \end{cases} \quad (6)$$

In another embodiment of the invention, since a hyperboloid of one sheet is a ruled surface it may be described by two families of straight lines, the first family being called generating rays rotating around an axis called a chief ray and consisting in the second family. The chief ray and any generating rays are sufficient to define a pixel beam.

Figure 5:
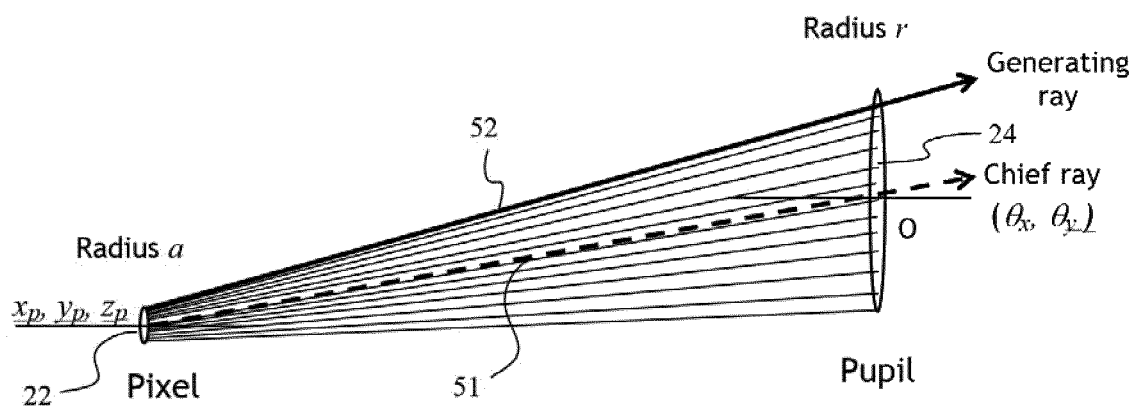
FIG. 5 represents a chief ray and a generating ray defining a pixel beam according to an embodiment of the invention.

As represented on FIG. 5, the first ray to be considered as describing a pixel beam 50 is its axis or chief ray 51. The chief ray 51 corresponds to the z axis of the hyperboloid 20, 30, 40, 50 as represented on FIG. 2.

Shearing the hyperboloid 20, 30, 40, 50 so that the main axis is oriented in direction (θx,) gives the equation:

$$(x-z \cdot tx)^2/a^2 + (y-z \cdot ty)^2/a^2 - (z-z_P)^2/c^2 = 1 \quad (7)$$

where tx=tan(θx) ty=tan(θy), $z_P$ is the position of the waist of the pixel beam on the z axis, and a and c represent the length of the semi-axes of the hyperboloid along the x, y and z axis respectively.

The second ray to consider when describing the hyperboloid of one sheet representing the pixel beam 10, 20, 30, 40, 50 is a generating ray 52. The family of generating rays 52 describes the surface of the hyperboloid 50.

Information related to a correspondence between pixels of a sensor of said optical acquisition system and an object space of said optical acquisition system may take the form of either a set of parameters comprising the four independent parameters: $z_P$, $\theta_x$, $\theta_y$, a defining the position and size of the pixel conjugate 25, 45, in front of the pupil 24, 34 and the six pupilar parameters $x_O$, $y_O$, $z_O$, $\theta_{xO}$, $\theta_{yO}$, r which define the position, orientation and radius of the pupil 24, 34 when the pixel beam is to be represented by its parametric equation; or by a set of parameters defining the chief ray 51 and a family of generating rays 52 when the pixel beam is 20, 30, 40, 50 to be represented by these two rays 20, 30, 40, 50. Thus, one of these two sets of parameters are provided in addition to raw images or epipolar images representing 4D light-field data captured by the optical acquisition system in order to be used while processing the 4D light-field data.

The first embodiment of the invention presents the advantage of requiring only two rays for defining the pixel beam: the chief ray and a generating ray. However this does not accurately translate the geometry of the underlying physics. Indeed, hyperboloids of one sheet do discard some rays that actually end up onto the sensor, and on the other hand they contain extra rays.

Figure 6:
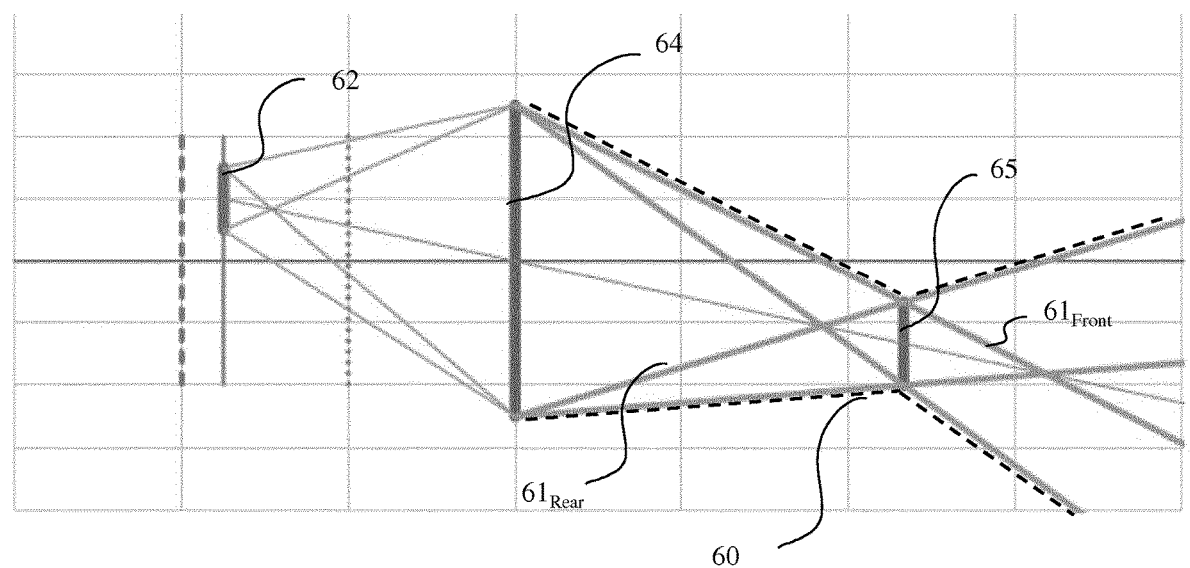
FIG. 6 represents the union of two cones.

In order to overcome this drawback, in a second embodiment of the invention, a pixel beam 60 may be represented by two coaxial, partially overlapping cones a front cone $61_F$ and a rear cone $61_R$ as shown on FIG. 6, supported by two elements: the pupil 64 and the conjugate 65 of the pixel 62 in the object space, i.e. the surface in the object space that is imaged on the pixel.

The front cone $61_F$ is the image of a convex frustum defined by the pixel 62 and the pupil 64. The apex of the convex frustum lies beyond the sensor of the optical acquisition system. By construction, the front cone $61_F$ is converging in the object space of the optical acquisition system and the apex of the front cone $61_F$ lies between the conjugate of the pixel 65, or the waist of the pixel beam 60, and the pupil 64. The front cone $61_F$ derives from the solid angle subtended by the pupil 64 at the pixel 62.

The rear cone $61_R$ is the image of a cone defined by the pixel 62 and the pupil 64, the apex of which lies between the pupil 64 and the sensor of the optical acquisition system. By construction, the apex of the rear cone $61_R$ is located beyond the waist 65 of the pupil 60. The rear cone $61_R$ does not necessarily converge in the object space of the optical acquisition system, in some cases, it may degenerate into a cylinder or a diverging cone. In the latter case, the apex of the diverging cone lies in the image space of the optical acquisition system, i.e. before the entrance of the pupil 64.

The front cone $61_F$ and the rear cone $61_R$ share the same revolution axis, which is a line joining the centre of the pupil 64 and the centre of the waist 65.

Cones are ruled surfaces that can support the notion of pencil of rays of light and when combining two cones is compatible with the notion of "étendue" of physical light beams, notion linked to the preservation of energy across sections of the physical light beams. Intersections of cones with planes are conic curves, as for hyperboloids, which can be characterized by a plurality of coefficients. Considering its apex, a cone may be represented by three angular parameters: a polar angle measured from the revolution axis of the cone, up to the apex angle and the direction of the revolution axis given by two angles.

Let xyz be the coordinate system of the optical acquisition system, z denoting the optical axis of the optical acquisition system with z>0 in the object space of the optical acquisition system and the centre of the pupil 64 being the origin of said coordinate system. The optics of the optical acquisition system images the object space of the optical acquisition system from the range $z \in [2f; +\infty]$ into the image space of the optical acquisition system $z \in [-2f; -f]$, where f is the focal length of the optics of the optical acquisition system. The location of the pupil 64 and the waist 65 of the pixel beam 60 are known in the coordinate system xyz of the optical acquisition system from the calibration of the optical acquisition system. The pupil 64 and the waist 65 are assumed to be parallel and are both normal to the z axis.

Let us call z' the chief ray of the pixel beam 60. The chief ray is the line joining the centre of the pupil 64 and the centre of the waist 65 of the pixel beam 60. The chief ray is also the revolution axis and the axis of symmetry of the pixel beam 60. Thus, in the coordinate system xyz', the pixel beam 60 is a solid of revolution.

Both the apices of the front cone $61_F$ and the rear cone $61_R$ are located on the chief ray z' of the pixel beam 60. Under the thin lens approximation, the coordinates of these two apices are computed in the coordinate system xyz of the optical acquisition system as follow, under the assumption that the sensor of the optical acquisition system is not located the rear focal plane:

$$\begin{cases} \frac{z_w - z_{front}}{W} = \frac{z_{front} - z_P}{P} \\ \frac{z_{rear} - z_w}{W} = \frac{z_{rear} - z_P}{P} \end{cases}$$

i.e., :

$$\begin{cases} z_{front} = \frac{P.z_W - W.z_P}{P + W} \\ z_{rear} = \frac{P.z_W - W.z_P}{P - W} \end{cases}$$

where P, $z_P$, W and $z_w$ respectively denote the diameter of the pupil 64 with P>0, its z-coordinate, the diameter of the pixel's conjugate 65 with $0<W<+\infty$, and its z-coordinate $0<z_w<+\infty$.

The z-coordinate $z_{rear}$ of the apex of the rear cone $61_R$ may be positive, when the rear cone $61_R$ is a converging cone, negative, when the rear cone $61_R$ is a diverging cone. It may also be infinite if the pupil 64 and the pixel's conjugate 65 of the pixel beam are of the same size.

If the sensor of the optical acquisition system is located on the rear focal plane, then $W=+\infty$ and $z_w=+\infty$. As their ratio is a constant:

$$\frac{1}{z_{front} - z_P} = \frac{p}{P.f} = \frac{1}{z_P - z_{rear}}$$

where p and f respectively represent the diameter of the pixel 62 with p>0 and the focal length of the optics of the optical acquisition system with f>0 assuming the optics of the optical acquisition system is a converging lens.

The apex angles are given by:

$$\begin{cases} \tan\theta_{front} = \frac{W/2}{|z_{front} - z_w|} \\ \tan\theta_{rear} = \frac{W/2}{|z_{rear} - z_w|} \end{cases}$$

Considering the apex of each cones, which union represents a pixel beam 60, rays can be defined with two angular parameters: the polar angle measure from the revolution axis of the pixel beam, up to the apex angle, and an azimuth in $[0, 2\pi[$.

Those additional information related to pixel beams are metadata associated to a given optical acquisition system. They may be provided as a data file stored for example on a CD-ROM or a flash drive supplied with the optical acquisition system. The data file containing the additional information related to pixel beams may also be downloaded from a server belonging to the manufacturer of the optical acquisition system. In an embodiment of the invention, these additional information related to pixel beams may also be embedded in a header of the images captured by the optical acquisition system.

The knowledge of these information related to pixel beams enables the processing of images captured by any optical acquisition system independently of the proprietary file format and of the features of the optical acquisition system used to capture the images to be processed.

Figure 7:
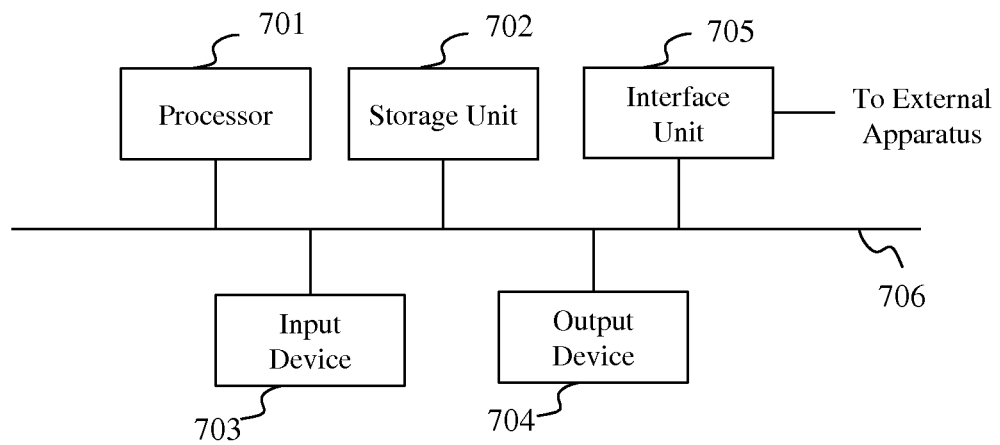
FIG. 7 is a schematic block diagram illustrating an example of an apparatus for encoding an image captured by an optical acquisition system according to an embodiment of the present disclosure.

FIG. 7 is a schematic block diagram illustrating an example of an apparatus for encoding an image captured by an optical acquisition system according to an embodiment of the present disclosure.

The apparatus 700 comprises a processor 701, a storage unit 702, an input device 703, a display device 704, and an interface unit 705 which are connected by a bus 706. Of course, constituent elements of the computer apparatus 700 may be connected by a connection other than a bus connection.

The processor 701 controls operations of the apparatus 700. The storage unit 702 stores at least one program capable of encoding an image acquired by the optical acquisition system to be executed by the processor 701, and various data, including parameters related to a position of the pixel 22 on the sensor 23 or parameters related to the optical system 21 of the optical acquisition system, parameters used by computations performed by the processor 701, intermediate data of computations performed by the processor 701, and so on. The processor 701 may be formed by any known and suitable hardware, or software, or a combination of hardware and software. For example, the processor 701 may be formed by dedicated hardware such as a processing circuit, or by a programmable processing unit such as a CPU (Central Processing Unit) that executes a program stored in a memory thereof.

The storage unit 702 may be formed by any suitable storage or means capable of storing the program, data, or the like in a computer-readable manner. Examples of the storage unit 702 include non-transitory computer-readable storage media such as semiconductor memory devices, and magnetic, optical, or magneto-optical recording media loaded into a read and write unit. The program causes the processor 701 to perform a process for computing parameters representing a volume occupied by a set of rays of light passing through a pupil of an optical system of a camera and a conjugate of a pixel of a sensor of the camera in an object space of the optical system in a direction normal to a surface of the pupil and encoding these parameters with an image captured by the optical acquisition system according to an embodiment of the present disclosure as described hereinafter with reference to FIG. 8.

The input device 703 may be formed by a keyboard, a pointing device such as a mouse, or the like for use by the user to input commands, to make user's selections of parameters used for generating a parametric representation of a volume occupied by a set of rays of light in an object space of an optical system. The output device 604 may be formed by a display device to display, for example, a Graphical User Interface (GUI), images generated according to an embodiment of the present disclosure. The input device 703 and the output device 704 may be formed integrally by a touch-screen panel, for example.

The interface unit 705 provides an interface between the apparatus 700 and an external apparatus. The interface unit 705 may be communicable with the external apparatus via cable or wireless communication. In an embodiment, the external apparatus may be optical acquisition system.

Figure 8:
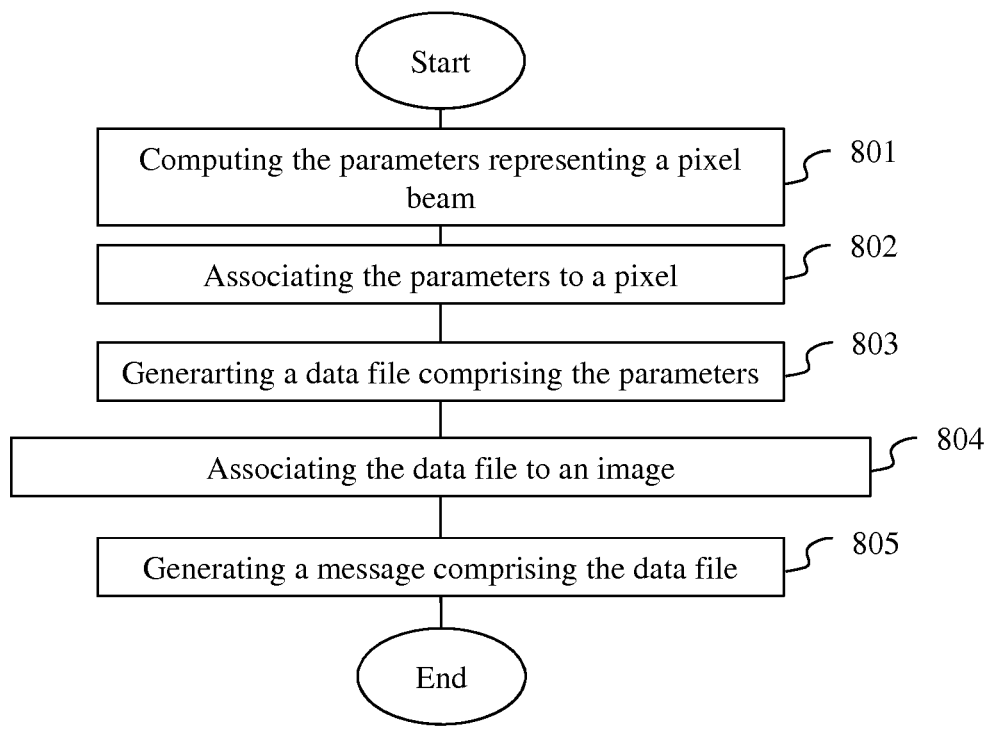
FIG. 8 is a flow chart for explaining a process for encoding an image captured by the optical acquisition system according to an embodiment of the disclosure.

FIG. 8 is a flow chart for explaining a process for encoding an image captured by the optical acquisition system according to an embodiment of the disclosure.

The processor 701 of the apparatus 700 executes the program capable of computing parameters representing a volume occupied by a set of rays of light passing through a pupil of an optical system 11 of a camera (not shown on FIG. 2) and a conjugate of a pixel of a sensor of the camera in an object space of the optical system in a direction normal to a surface of the pupil and encoding these parameters with an image captured by the optical acquisition system.

Thus, the processor 701 computes, during a step 801, at least, the parameter representing the pixel beams 10, 20, 30, 40, 50, 60 based on the parameters stored in the storage unit 702. The computed parameters depend on the type of representation of pixel beams 10, 20, 30, 40, 50, 60, the manufacturer has chosen, i.e. representing a pixel beam by means of the parametric equation of a hyperboloid or by means of a chief ray and a family of generating rays.

During a step 802, the processor 701 associates to a pixel of the sensor of the optical acquisition system that can sense light through a pupil of said optical acquisition system the parameters computed during step 801. Step 802 is executed for each pixel for of the sensor capable of sensing light through a pupil of the optical acquisition system.

During a step 803, the processor 701 generates data file comprising the computed parameters representing the pixel beams associated to the different pixels of the sensor of the optical acquisition system. The generated data file is stored for example on a CD-ROM or a flash drive supplied with the optical acquisition system or on a server belonging to the manufacturer of the optical acquisition system.

In another embodiment of the invention, during a step 804, the processor 701 associates the data file comprising the computed parameters representing the pixel beams associated to the different pixels of the sensor of the optical acquisition system to an image captured by the optical acquisition system. The data file is for example stored in a specific filed of a header of the captured images.

During a step 805, the processor 701 generates a message to be sent to an apparatus capable of processing an image captured by the optical acquisition system. In a first embodiment of the invention, the message comprises the data file comprising the computed parameters representing the pixel beams associated to the different pixels of the sensor of the optical acquisition system to an image captured by the optical acquisition system. In a second embodiment of the invention, the message consists in an image captured by the optical acquisition system embedding the data file in a field of its header.

This message is then transmitted through the interface unit 705 to an external apparatus during a step 806. The interface unit 705 transmits a signal to the external apparatus via cable or wireless communication carrying the message comprising the parameters. The external apparatus is capable of processing an image captured by the optical system 21 using the parameters received in the message transmitted by the apparatus 700.

Figure 9:
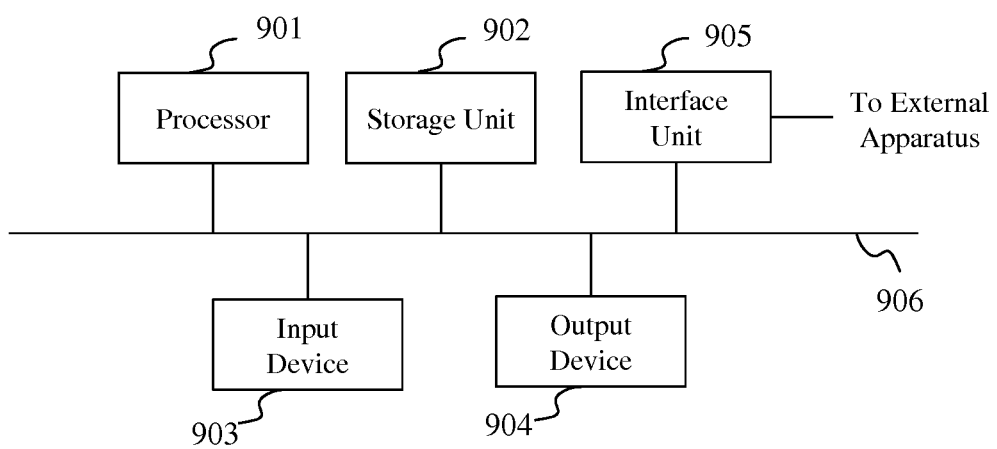
FIG. 9 is a schematic block diagram illustrating an example of an apparatus for processing an image captured by an optical acquisition system according to an embodiment of the present disclosure.

FIG. 9 is a schematic block diagram illustrating an example of an apparatus for processing an image captured by an optical acquisition system according to an embodiment of the present disclosure.

The apparatus 900 comprises a processor 901, a storage unit 902, an input device 903, a display device 904, and an interface unit 905 which are connected by a bus 906. Of course, constituent elements of the computer apparatus 900 may be connected by a connection other than a bus connection.

The processor 901 controls operations of the apparatus 900. The storage unit 902 stores at least one program capable of processing an image acquired by the optical acquisition system to be executed by the processor 901, and various data, including parameters related to a position of the pixel 22 on the sensor 23 or parameters related to the optical system 21 of the optical acquisition system, parameters used by computations performed by the processor 901, intermediate data of computations performed by the processor 901, and so on. The processor 901 may be formed by any known and suitable hardware, or software, or a combination of hardware and software. For example, the processor 901 may be formed by dedicated hardware such as a processing circuit, or by a programmable processing unit such as a CPU (Central Processing Unit) that executes a program stored in a memory thereof.

The storage unit 902 may be formed by any suitable storage or means capable of storing the program, data, or the like in a computer-readable manner. Examples of the storage unit 902 include non-transitory computer-readable storage media such as semiconductor memory devices, and magnetic, optical, or magneto-optical recording media loaded into a read and write unit. The program causes the processor 901 to perform a process for processing an image captured by the optical acquisition system based on the parameters of the pixel beams provided with the image to be processed according to an embodiment of the present disclosure as described hereinafter with reference to FIG. 10.

The input device 903 may be formed by a keyboard, a pointing device such as a mouse, or the like for use by the user to input commands, to make user's selections of parameters used for processing the image captured by the optical acquisition system. The output device 904 may be formed by a display device to display, for example, a Graphical User Interface (GUI), images generated according to an embodiment of the present disclosure. The input device 903 and the output device 904 may be formed integrally by a touch-screen panel, for example.

The interface unit 905 provides an interface between the apparatus 900 and an external apparatus. The interface unit 905 may be communicable with the external apparatus via cable or wireless communication. In an embodiment, the external apparatus may be optical acquisition system or the apparatus 700.

Figure 10:
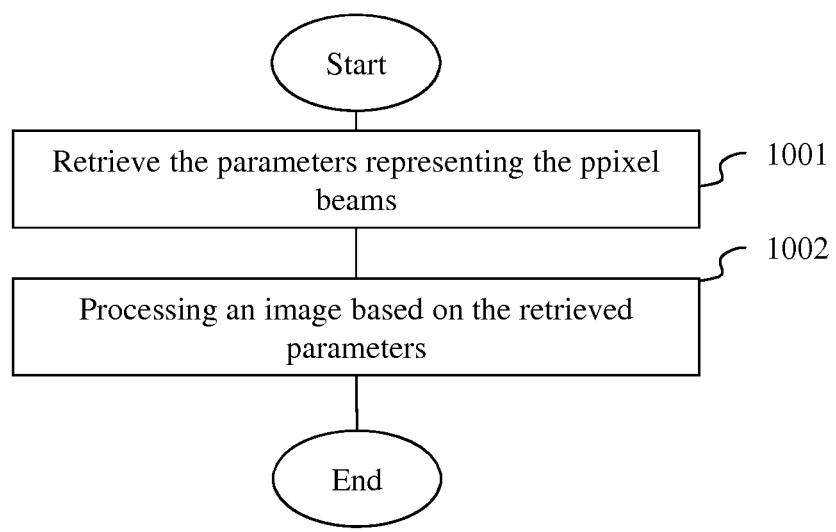
FIG. 10 is a flow chart for explaining a process for processing an image captured by the optical acquisition system according to an embodiment of the disclosure.

FIG. 10 is a flow chart for explaining a process for processing an image captured by the optical acquisition system according to an embodiment of the disclosure.

The processor 901 of the apparatus 900 executes the program capable of processing an image captured by the optical acquisition system based on the parameters representing a pixel beam associated with the image to be processed.

Thus, the processor 901, during a step 1001, retrieves the parameters representing the pixel beams that are to be used to process the captured image either from a CD-ROM or a flash drive supplied with the optical acquisition system or by downloading the data file comprising said parameters from a server belonging to the manufacturer of the optical acquisition system. In an embodiment of the invention, the processor 901 retrieves these parameters in the header of the image to be processed.

Then, during a step 1002, processes, during a step 1001, the image captured by the optical acquisition system based on the parameters representing the pixel beams 10, 20, 30, 40, 50, 60 retrieved during step 1001.

The processing of the captured image may consists in de-multiplexing, de-mosaicking, refocusing, or mixing said captured image with at least another image captured by a different optical acquisition system, or a combination of any of these actions.

Although the present invention has been described hereinabove with the reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

The invention claimed is:

1. An apparatus for encoding an image captured by an optical acquisition system, said apparatus comprising a processor configured to compute for at least one pixel of a sensor of said optical acquisition system parameters defining a volume in an object space of the optical acquisition system occupied by a set of rays of light passing through a pupil of said optical acquisition system and a conjugate of said at least one pixel in the object space of the optical acquisition system in a direction normal to a surface of the pupil, said volume occupied by said set of rays of light being called a pixel beam, wherein the pixel beam is represented by a hyperboloid of one sheet in the object space of the optical acquisition system, and the parameters comprise at least a first set of parameters representing an axis of the hyperboloid called a chief ray and a second set of parameters representing a family of generating rays enabling the generation of a surface of the hyperboloid by rotating around the chief ray.

2. The apparatus according to claim 1 wherein the processor is further configured to associate the parameters representing the pixel beams to an image acquired by the optical acquisition system to be encoded.

3. The apparatus according to claim 1 wherein the parametric representation of the pixel beam as a hyperboloid of one sheet is defined by the following equations:

$$\begin{cases} x = a\sqrt{1 + \frac{(z-z_P)^2}{c^2}} \cdot \cos(v) + z.\tan(\theta_x) \\ y = a\sqrt{1 + \frac{(z-z_P)^2}{c^2}} \cdot \sin(v) + z.\tan(\theta_y) \end{cases}$$

where x, y, and z are the coordinates in the object space of a point belonging to the surface of the hyperboloid, $z_p$, $\theta_x$, $\theta_y$, a, $z_p$ representing a distance of the smallest section of the pixel beam, called the waist, which corresponds to the conjugate of the pixel in the object space of the optical acquisition system in a direction normal to a surface of the pupil, $\theta_x$, $\theta_y$ representing shear angles defining a direction of the waist from the centre of the pupil, a representing a dimension of waist; c is a parameter dependent on a defining the angular aperture of the pixel beam, and v is an angle varying in [0, 2π] interval.

4. The apparatus according to claim 3 wherein the parametric representation of the pixel beam as a hyperboloid of one sheet is further defined by the following equations:

$$\begin{cases} x = a\sqrt{1 + \frac{(z-z_P)^2}{c^2}} \cdot [\alpha.\rho_O + (1-\alpha).\rho_P].\cos(v) + z.\tan(\theta_x) \\ y = a\sqrt{1 + \frac{(z-z_P)^2}{c^2}} \cdot [\alpha.A_O.\rho_O + (1-\alpha).A_P.\rho_P].\sin(v) + z.\tan(\theta_y) \end{cases}$$

where $A_O$ is the parameter representing an aspect ratio for an asymmetric pupil, $A_P$ is the parameter representing an aspect ratio for an asymmetric waist, a is the parameter related to a propagation of a section of the pixel beam between the pupil and the waist, $\rho_O$ is the parameter representing a polar radius factor for the pupil and $\rho_P$ is the parameter representing a polar radius factor for the waist.

5. The apparatus according to claim 1 wherein the parametric representation of the pixel beam as a hyperboloid of one sheet can be represented by a union of a front cone and a rear cone, the front cone and the rear cone overlapping each other.

6. The apparatus according to claim 5 wherein the parametric representation of the pixel beam as the union of a front cone and a rear cone is given by the following equations:

$$\begin{cases} z_{front} = \frac{P.z_W - W.z_P}{P + W} \\ z_{rear} = \frac{P.z_W - W.z_P}{P - W} \end{cases}$$

where $z_{front}$ represents the z-coordinate of the apex of the front cone, $z_{rear}$ represents the z-coordinate of the apex of the rear cone, P, $z_p$, W and $z_w$ respectively denote the diameter of the pupil of the pixel beam with P>0, its z-coordinate, the diameter and the z-coordinate of the waist of the pixel beam with 0<W<+∞, and its z-coordinate 0<$z_w$<+∞, and $$\begin{cases} \tan\theta_{front} = \dfrac{W/2}{|z_{front} - z_w|} \\ \tan\theta_{rear} = \dfrac{W/2}{|z_{rear} - z_w|} \end{cases}$$

where $\theta_{front}$ and $\theta_{rear}$ are the apex angles of respectively the front cone and the rear cone.

7. The apparatus according to claim 5 wherein the parametric representation of the pixel beam as the union of a front cone and a rear cone is given by the following equations when W=+∞ and $z_w$=+∞:

$$\dfrac{1}{z_{front} - z_P} = \dfrac{p}{P.f} = \dfrac{1}{z_P - z_{rear}}$$

where p and f respectively represent the diameter of the pixel with p>0 and the focal length of the optics of the optical acquisition system with f>0, and $$\begin{cases} \tan\theta_{front} = \dfrac{W/2}{|z_{front} - z_w|} \\ \tan\theta_{rear} = \dfrac{W/2}{|z_{rear} - z_w|} \end{cases}.$$

8. A method for encoding an image captured by an optical acquisition system, said method comprising computing for at least one pixel of a sensor of said optical acquisition system parameters defining a volume in an object space of the optical acquisition system occupied by a set of rays of light passing through a pupil of said optical acquisition system and a conjugate of said at least one pixel in the object space of the optical acquisition system in a direction normal to a surface of the pupil, said volume occupied by said set of rays of light being called a pixel beam, wherein the pixel beam is represented by a hyperboloid of one sheet in the object space of the optical acquisition system, and the parameters comprise at least a first set of parameters representing an axis of the hyperboloid called a chief ray and a second set of parameters representing a family of generating rays enabling the generation of a surface of the hyperboloid by rotating around the chief ray.

9. The method according to claim 8 further comprising associating the parameters representing pixel beams to an image acquired by the optical acquisition system to be encoded.

10. An apparatus for processing an image captured by an optical acquisition system, said apparatus comprising a processor configured to process said image based on parameters associated to at least one pixel of a sensor of the optical acquisition system, said parameters defining a volume in an object space of the optical acquisition system occupied by a set of rays of light passing through a pupil of said optical acquisition system and a conjugate of said at least one pixel in the object space of the optical acquisition system in a direction normal to a surface of the pupil, said volume occupied by said set of rays of light being called a pixel beam, wherein the pixel beam is represented by a hyperboloid of one sheet in the object space of the optical acquisition system, and the parameters comprise at least a first set of parameters representing an axis of the hyperboloid called a chief ray and a second set of parameters representing a family of generating rays enabling the generation of a surface of the hyperboloid by rotating around the chief ray.

11. The apparatus according to claim 10 wherein the processor is configured to process the captured image by:
   de-multiplexing said captured image,
   de-mosaicking said captured image,
   refocusing said captured image, or
   mixing said captured image with at least another image captured by a different optical acquisition system.

12. A method for processing an image captured by an optical acquisition system, said method comprising processing said image based on parameters associated to at least one pixel of a sensor of the optical acquisition system, said parameters defining a volume in an object space of the optical acquisition system occupied by a set of rays of light passing through a pupil of said optical acquisition system and a conjugate of said at least one pixel in the object space of the optical acquisition system in a direction normal to a surface of the pupil, said volume occupied by said set of rays of light being called a pixel beam, wherein the pixel beam is represented by a hyperboloid of one sheet in the object space of the optical acquisition system, and the parameters comprise at least a first set of parameters representing an axis of the hyperboloid called a chief ray and a second set of parameters representing a family of generating rays enabling the generation of a surface of the hyperboloid by rotating around the chief ray.

13. The method according to claim 12 wherein processing the captured image comprises:
   de-multiplexing said captured image,
   de-mosaicking said captured image,
   refocusing said captured image, or
   mixing said captured image with at least another image captured by a different optical acquisition system.

14. A non-transitory computer readable medium storing executable program instructions to cause a computer executing the instructions to perform a method comprising computing for at least one pixel of a sensor of an optical acquisition system parameters defining a volume in an object space of the optical acquisition system occupied by a set of rays of light passing through a pupil of said optical acquisition system and a conjugate of said at least one pixel in the object space of the optical acquisition system in a direction normal to a surface of the pupil, said volume occupied by said set of rays of light being called a pixel beam, wherein the pixel beam is represented by a hyperboloid of one sheet in the object space of the optical acquisition system, and the parameters comprise at least a first set of parameters representing an axis of the hyperboloid called a chief ray and a second set of parameters representing a family of generating rays enabling the generation of a surface of the hyperboloid by rotating around the chief ray.

* * * * *

UNITED STATES PATENT AND TRADEMARK OFFICE
CERTIFICATE OF CORRECTION

PATENT NO. : 10,872,442 B2  Page 1 of 1
APPLICATION NO. : 15/759874
DATED : December 22, 2020
INVENTOR(S) : Laurent Blonde et al.

It is certified that error appears in the above-identified patent and that said Letters Patent is hereby corrected as shown below:

In the Claims

At Column 16, Line 57-63, Claim 6, replace:

$$\begin{cases} z_{front} = \dfrac{P \cdot z_w - W \cdot z_p}{P + W} \\ z_{rear} = \dfrac{P \cdot z_w - W \cdot z_p}{P - W} \end{cases}$$

With the following:

$$\begin{cases} z_{front} = \dfrac{P \cdot z_w + W \cdot z_p}{P + W} \\ z_{rear} = \dfrac{P \cdot z_w - W \cdot z_p}{P - W} \end{cases}$$

Signed and Sealed this
Nineteenth Day of August, 2025

Coke Morgan Stewart
*Acting Director of the United States Patent and Trademark Office*